J. LEDWINKA.
METALLIC VEHICLE BODY.
APPLICATION FILED NOV. 22, 1912.
1,139,457.
Patented May 11, 1915.
2 SHEETS—SHEET 1.
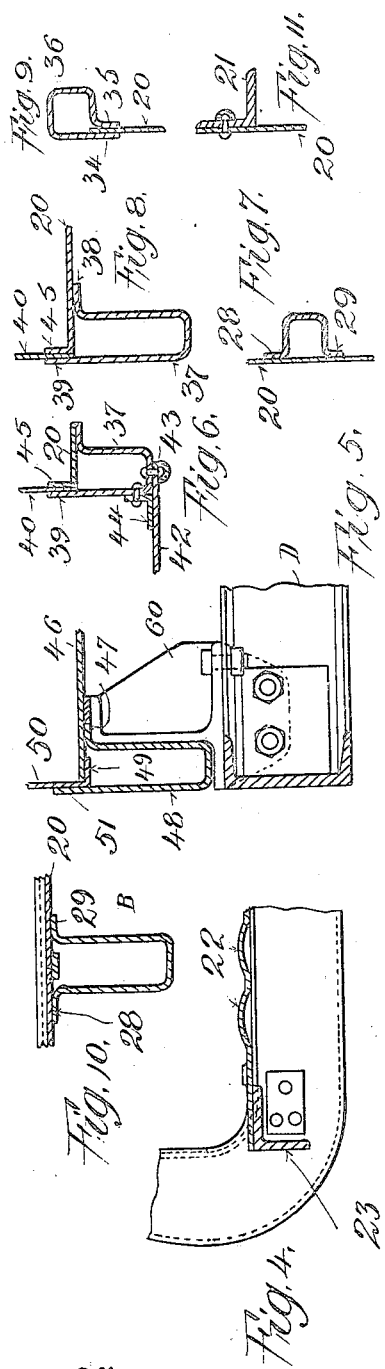
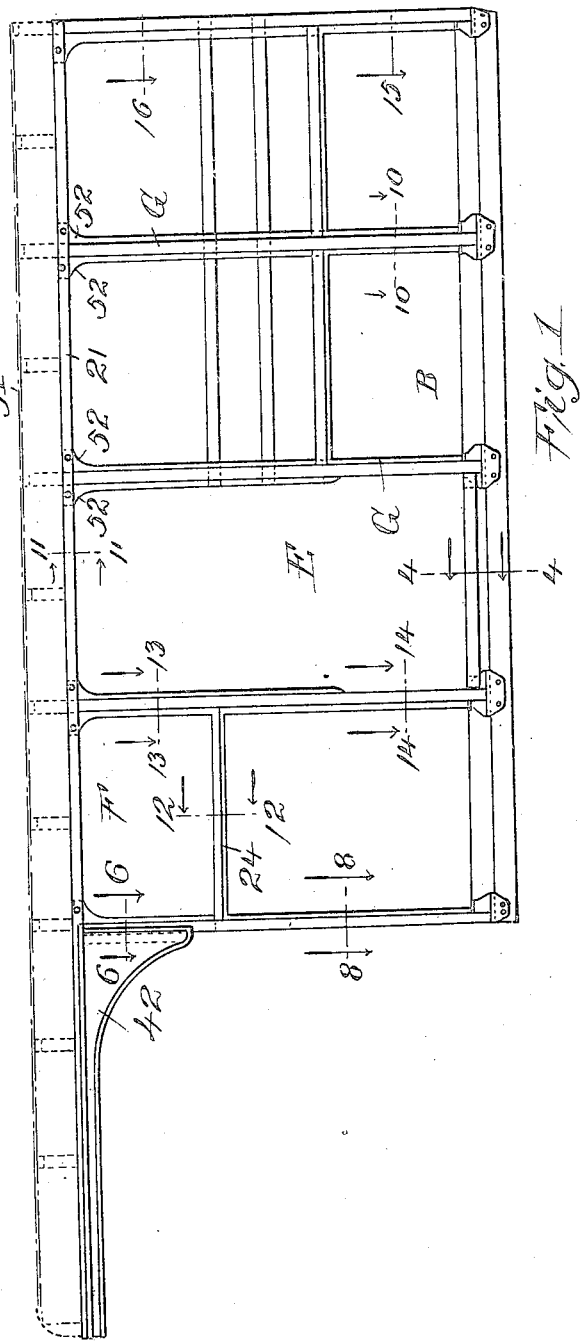

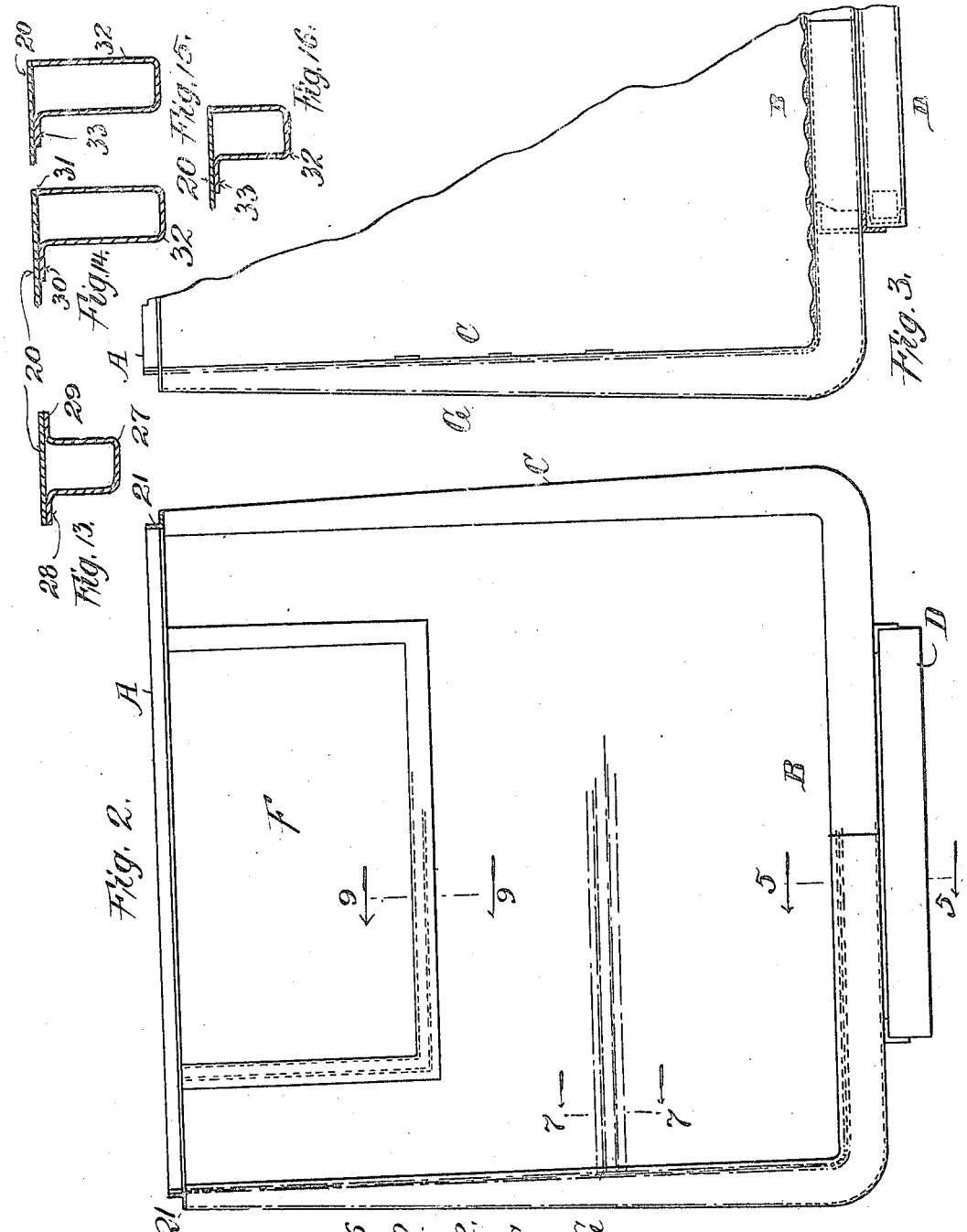

UNITED STATES PATENT OFFICE.

JOSEPH LEDWINKA, OF PHILADELPHIA, PENNSYLVANIA.

METALLIC VEHICLE-BODY.

1,139,457.	Specification of Letters Patent.	Patented May 11, 1915.

Application filed November 22, 1912. Serial No. 732,835.

*To all whom it may concern:*

Be it known that I, JOSEPH LEDWINKA, a citizen of the United States, residing at Philadelphia, county of Philadelphia, State of Pennsylvania, have made a certain new and useful Invention in Metallic Vehicle-Bodies, of which the following is a specification.

This invention relates to metallic vehicle bodies.

The object of the invention is to provide a vehicle body which is strong, durable and economical to manufacture.

A further object is to provide a vehicle body which is made up, for the most part, of sheet metal parts of standard construction and shaped or reduced to suitable form to secure strength and rigidity with a minimum weight.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

In the accompanying drawings,—Figure 1 is a view in side elevation of one form of vehicle body constructed in accordance with and embodying the principles of my invention. Fig. 2 is a view in front elevation of the form of vehicle body shown in Fig. 1. Fig. 3 is a broken view in vertical transverse section of the same. Figs. 4 to 16 inclusive are broken detail sectional views in the planes respectively indicated by the lines 4, 4; 5, 5; 6, 6; 7, 7; 8, 8; 9, 9; 10, 10; 11, 11; 12, 12; 13, 13; 14, 14; 15, and 16, Figs. 1 and 2.

The same part is designated by the same reference numeral wherever it occurs throughout the several views.

In the manufacture of vehicle bodies for the market it is exceedingly desirable to secure the maximum strength and rigidity with the minimum weight of material used. It is also desirable to avoid as far as possible jointing the parts together in assembling the frame as the presence of joints causes the parts to rapidly work loose. And in order to secure economy in the manufacture of such devices it is essential that as many parts as possible be of standard form and structure to the end that they may be made up in quantities and still be assembled together in various ways to secure different styles and designs of vehicle bodies.

It is among the special purposes of my present invention to attain these and other desirable results, and in carrying out my invention, I propose to employ sheet metal in making up the standard parts referred to, and to shape and form the same, into the desired configuration to secure the greatest possible strength and rigidity with the least possible weight of material.

In the accompanying drawings, I have shown, as a selected exemplification of the principles involved, the body of a grocer's delivery wagon constructed in accordance with my invention, and while each particular style or design of vehicle body may differ in some of the details of structure or parts thereof, or in their assemblage together, according to the particular use to which the vehicle body is to be put, still, the principal essential features remain the same throughout a wide variety of designs of bodies. It will be understood, therefore, that my invention is not to be limited or restricted in respect to any particular type, design or style of vehicle body, in the broadest scope thereof as defined in the claims.

In its essential features a vehicle body constructed in accordance with the principles of my invention embodies frame pieces, preferably in the form of angle plates to which are secured the body or lining and flooring pieces, said body or lining and flooring pieces being in the form of sheet metal plates suitably shaped to the desired contour. These body or lining and flooring plates are preferably of standard width and they are assembled together, edge to edge, to produce a vehicle body of the desired length. It is obvious that the floor sheets or plates may be formed separately from or in one piece with the side body lining plates. In either case the sheets or plates are made of uniform or standard lengths, and in assembling them they are pressed or formed into the desired shapes and contour. Also, in accordance with my invention the body of the vehicle is strengthened and rendered stronger and more rigid by applying thereto channel shaped metal ribs formed by stamping or pressing sheet metal plates of standard dimensions into the desired or required shapes. These ribs are applied to the body of the vehicle at such points and in such relations as to secure the best results, and as may be required by the particular character, style or design of body to be produced, or in accordance with the necessities to be fulfilled in the particular use to which the vehicle is to be put.

Referring specifically to the grocer's delivery wagon body shown which I have selected for the purpose of illustrating the principles of my invention, the vehicle body is made up, generally, of a top A, a bottom B, and side walls C. This body is designed to be supported upon the vehicle chassis, a portion of which is shown at D, Figs. 2 and 3. The body or lining is composed of metal sheets or plates 20 forming the sides and rear end of the vehicle body. These plates are cut to standard widths and lengths, according to the particular design or style of vehicle body to be produced and its location, in such body. For instance, if the side of the vehicle body is to be continuous from the top or roof A, to the bottom, then the body or lining plates should be of such length as to extend from the longitudinal top or roof member 21, on one side of the vehicle body, down to the floor B, then transversely across the vehicle body to form the flooring therefor, and then up to the corresponding roof or top member 21 on the opposite side of the vehicle body. In this manner the flooring and side or body lining are made in one piece of sheet metal, said sheet being pressed or otherwise formed into the required shape. If, however, a doorway is to be provided in the side of the vehicle, as indicated at E, Fig. 1, then the side lining is omitted at that point and only the flooring sheet is employed, as indicated at 22, Fig. 4, said flooring sheet being secured at its ends to side bars 23, preferably in the form of angle bars, which not only support the ends of the floor sheets but which also form the sills for the doorways. Again, if the side of the vehicle is to be provided with window-openings, as indicated at F, Fig. 1, then, of course, the lining sheets or plates will extend only to the height of the lower edge 24 of the window opening, as indicated in Figs. 1 and 12. In this case the lower edge of the window opening is in the form of a box channel, 24, see Fig. 12, and the upper end or edge of the body lining 20, is received between the lips 25, 26 of the box channel 24, and these parts welded, riveted or otherwise suitably secured together. Similarly, where an angle plate 23, is employed as the sill of a door opening the end of the flooring sheet or plate 22 may be welded, riveted or otherwise secured thereto.

The frame body of the vehicle is strengthened and stiffened by body ribs, indicated generally by reference letter G, in Figs. 1, 2 and 3. These are preferably in the form of box channel members shaped up from sheet metal and in standard lengths and sizes. They are applied transversely along the sides and beneath the flooring of the vehicle body, as shown in Figs. 2 and 3. In practice I prefer to make these body ribs of sufficient length to extend from the side angle plates 21, down along the sides of the vehicle body and thence underneath the flooring to a point approximately at the center line of the floor where the body rib on one side meets its mate on the other side, the meeting ends thereof being welded together. In this manner, the channeled body ribs are pressed into angular shape longitudinally to make the necessary corner at the side edge of the floor, as indicated in Figs. 2 and 3. I also prefer to taper the body ribs G, in the direction of the length thereof, as clearly shown, thus reducing the weight of the vehicle body toward the top thereof and hence avoiding top heaviness without sacrificing anything of strength or rigidity. This is a valuable feature of my invention because of the advantage attained thereby as stated. The ribs G are, generally, of substantially U-shape in cross section, as indicated at 27, Fig. 13, the flanges 28, 29, thereof being applied against the body lining 20 and welded or secured thereto in some other suitable or convenient manner. Where a body rib forms the side of a door or window opening, as indicated, for instance in Fig. 14, the flange on one side of the box channel rib 32, is omitted, only one side flange 30, being provided, which, together with the joint, indicated at 31, between the lining plate 20 and the other edge of the channel rib, is welded or otherwise secured to the plate 20. At the point where the vehicle body forms a vertical corner, as, for instance, where the side joins the rear end of such body, the box channel rib 32, is provided with a flange 33, at only one edge thereof, as shown in Figs. 15 and 16, the said rib being welded or secured to the body lining 20, in the same manner as above described with reference to the construction shown in Fig. 14. Where the rib forms the sill of a window or door opening, as shown in Fig. 9, the edge of the body lining sheet 20 is received between the lips 34, 35, of the box channel rib 36, and the joints suitably welded. Where the stiffening and strengthening rib is applied to the surface of the body lining at uninterrupted points, as shown in Figs. 7, 10 and 13, the arrangement is identical with that above described, with reference to Fig. 13. That is to say, the box channel rib is formed with a flange 28, 29, at each edge thereof which lie against the surface of the body lining, the joints being preferably welded.

In Fig. 8 is shown an arrangement at one of the front corners of the vehicle body. Here the strengthening rib 37 has one flange 38, designed to lie against the surface of the side body lining 20, while the other edge 39 of the channel rib is somewhat extended to lie against the front plate 40 of the vehicle body where such a front plate is employed, all joints preferably being welded.

In some classes of vehicle bodies an extension of the roof is provided to form a cover for the driver. Such an overhanging roof portion is shown in the particular type of vehicle body which I have selected to illustrate my invention. In this case it is desirable to reinforce the overhang of the roof or top, and to make the same stronger and more rigid and better able to withstand the vibration to which the roof or the overhung portion thereof may be subjected. I have shown an arrangement for accomplishing this wherein a side plate 42, is applied to the roof overhang. At its rear edge this strengthening plate 42 is riveted flatwise against the outer web surface of the body rib 37. If desired a molding 43, may be applied over the joint not only to conceal the same but also to form an ornamental finish. Should additional strengthening be required at this point, an angle plate 44, may be applied to the strengthening plate 42, and the side surface of the box channel, respectively, at the junction thereof, and as clearly seen in Fig. 6. The extreme edge of the body lining 20, at this point, and as indicated in Figs. 6 and 8, may be turned up, at 45, to bear against the surface of the cross plate 40, of the front of the vehicle body.

In Fig. 5, I have shown the construction where the rear end plate of the vehicle body joins the floor lining. In this arrangement the edge of the floor lining 46, rests upon a flange 47, of the box channel 48, and also against a horizontal flange 49, of the vertically disposed end plate 50 of the vehicle body, the other edge 51 of the box channel lying against the outer surface of the end plate 50, all joints preferably being welded.

If desired and to increase the strength and rigidity of the vehicle body structure, the body or floor linings or plates may be corrugated or fluted as indicated in Figs. 3 and 4.

At the points where the body ribs join the longitudinal rail or bar members 21 of the top or roof, said ribs are preferably broadened out, as indicated at 52, so as to increase the areas thereof where joining with said roof or top bars, thus securing greater strength and rigidity of the structure. In practice I prefer to bolt the upper ends of the ribs and body lining plates to the side bars 21 of the roof so as to make the latter removable. This I regard as a valuable feature as it enables the roof to be readily removed for repair or renewal without affecting the remaining part of the body structure.

In applying the vehicle body to the chassis body D, see Figs. 2 and 5, I employ castings 60 to which the flooring 46, and the flange 47 of the rib 48, are secured, and which castings are, in turn, secured, preferably by bolting, to the chassis frame member D.

From the foregoing description it will be seen that I provide an exceedingly strong and durable vehicle body which is made up of sheet steel and out of parts which are made in standard form and dimensions, and which can therefore be made economically and assembled in various relations to form various types, styles and designs of vehicle bodies. It will also be seen that the box channel body ribs employed not only serve to secure strength and rigidity of the body structure and to prevent the same from racking loose by usage and the incident vibration to which such structure is subjected, but they also preserve the body from the danger of becoming dented or injured in case of violent contact or collision with pillars, street posts, other vehicles, or the like. It will also be seen that I avoid rivet or bolt joints at all points where the danger of the joints working loose exists. I also secure a structure of minimum weight and maximum strength.

Having now set forth the objects and nature of my invention, and a construction embodying the principles thereof, what I claim as new and useful and of my own invention, and desire to secure by Letters Patent is:—

1. The combination with a vehicle body composed of sheet metal sides and bottom, of strengthening ribs secured to the body side and an angle bar secured at its ends to adjacent ribs to form a sill for a doorway through the body side, said angle bar also forming a support for the edge of the body floor.

2. The combination with a chassis frame member, a bracket secured thereto, a channel shaped strengthening rib secured to the bracket, and a sheet metal body secured to said rib.

3. The combination with a vehicle body composed of sheet metal sides and bottom and flanged channel shaped strengthening ribs secured thereto, of a top having longitudinally extending side members, the flanges of said ribs being extended laterally at their upper ends to increase the areas thereof and adapted to be attached to said side members.

4. The combination with a vehicle body composed of sheet metal sides, bottom and top or cover, said top or cover extending beyond the end of the body, of a channel shaped strengthening rib for the side of the body and a plate attached to the side of the top extension and to the web portion of said strengthening rib.

5. The combination with a vehicle body composed of sheet metal sides and a transversely extending end plate, of a rib channel shaped in cross section and having a laterally extending flange at one edge and the other edge straight or unflanged, said flange and the other edge of said rib being secured, respectively to said side and end plates.

6. The combination with a vehicle body composed of sheet metal sides and end portions and a roof, said roof extending beyond the end of the body, of a rib channel shaped in cross section and arranged at the junction of and having its edges secured, respectively, to said side plate and end portion, and a strengthening plate secured to the side of the roof extension and to the web portion of said channel rib.

7. The combination with sheet metal plates bent to form vertical side and bottom portions of a vehicle body, one of said plates being shorter in its vertical length than the adjacent ones, to form a window opening, of a metallic rib bent into closed channel shape in cross section and arranged to form the sill of the window opening, the upper edge of the vertical portion of the shortened side plate being received and secured between the edges of the channel rib.

8. The combination with a vehicle body composed of sheet metal plates bent to form vertical side and body portions of the body, and a horizontally extending frame member to which the upper edges of the vertical side portions are attached, of strengthening ribs formed of sheet metal and bent into channel shape in cross section, the edges thereof being laterally flanged, the flanged portions of said ribs being broadened out at their upper ends where attached to the horizontal frame member, said ribs bent longitudinally to conform to the exterior contour of the bent body plates for application to the vertical and bottom portions of said plates, said parts being integrally secured together to form a seamless and rivetless structure.

In testimony whereof I have hereunto set my hand in the presence of the subscribing witnesses, on this 29th day of October A. D., 1912.

JOSEPH LEDWINKA.

Witnesses:
 ALLEN M. STEARNE,
 B. L. DIEHL.